(12) United States Patent
Walters et al.

(10) Patent No.: US 8,120,200 B2
(45) Date of Patent: Feb. 21, 2012

(54) FAST RESPONSE FAILURE MODE CONTROL METHODOLOGY FOR A HYBRID VEHICLE HAVING AN ELECTRIC MACHINE

(75) Inventors: James E. Walters, Carmel, IN (US); Gerald T. Fattic, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 183 days.

(21) Appl. No.: 12/396,679

(22) Filed: Mar. 3, 2009

(65) Prior Publication Data
US 2010/0110594 A1  May 6, 2010

Related U.S. Application Data

(63) Continuation-in-part of application No. 12/290,974, filed on Nov. 5, 2008.

(51) Int. Cl.
*B60L 1/00* (2006.01)
*B60L 3/00* (2006.01)
*H02G 3/00* (2006.01)

(52) U.S. Cl. ............. 307/10.1; 307/9.1; 307/43; 307/52; 307/60; 307/64; 307/67; 307/80

(58) Field of Classification Search ........................ None
See application file for complete search history.

(56) References Cited

U.S. PATENT DOCUMENTS

| | | | |
|---|---|---|---|
| 5,334,926 A * | 8/1994 | Imaizumi | 320/104 |
| 5,705,909 A * | 1/1998 | Rajashekara | 318/801 |
| 7,050,281 B2 * | 5/2006 | Ohta et al. | 361/93.9 |
| 7,075,306 B2 * | 7/2006 | Emori et al. | 324/430 |
| 7,414,331 B2 * | 8/2008 | Datta | 307/71 |
| 7,439,697 B2 * | 10/2008 | Miyazaki et al. | 318/400.41 |
| 2002/0091470 A1 * | 7/2002 | Sasazawa et al. | 701/22 |
| 2007/0029979 A1 * | 2/2007 | Williams et al. | 323/217 |
| 2008/0265683 A1 * | 10/2008 | Zhu et al. | 307/80 |

OTHER PUBLICATIONS

JP Pg-pub 2003-134606 to Katsuta—english translation, May 9, 2003.*
JP Pg-pub 2001-185228 to Furukawa—english translation, Jul. 6, 2001.*

* cited by examiner

*Primary Examiner* — Rexford Barnie
*Assistant Examiner* — Justen Fauth
(74) *Attorney, Agent, or Firm* — Lawrence D. Hazelton

(57) ABSTRACT

A control methodology for an engine-driven electric machine of a hybrid vehicle electrical system for enabling continued operation of the vehicle electrical system under failure mode conditions that require or result in disconnection of the battery pack from the electrical system. At the onset of a fault condition requiring battery disconnection, the electric machine is controlled to drive the battery pack current toward zero before disconnecting the battery pack. Once the battery pack is disconnected, whether by relay or fuse, the electric machine is controlled to maintain the bus voltage of the electrical system at a specified value. In both operating modes, the electric machine is controlled based on a synchronous vector current command that is determined directly as a function of the control objective (zero battery pack current or maintaining bus voltage) for improved response time compared to a traditional torque-based control.

5 Claims, 4 Drawing Sheets

FAST RESPONSE FAILURE MODE CONTROL METHODOLOGY FOR A HYBRID VEHICLE HAVING AN ELECTRIC MACHINE

RELATED APPLICATIONS

The present invention is a continuation-in-part of co-pending U.S. patent application Ser. No. 12/290,974, filed Nov. 5, 2008, and assigned to the assignee of the present patent application.

FIELD OF THE INVENTION

The present invention is directed to a failure-mode battery disconnect method for a hybrid vehicle electrical system including a high voltage battery pack and an engine-driven electric machine operable in generating and motoring modes, and more particularly to a control method for the electric machine that permits continued operation of the engine and electric machine after the battery pack is disconnected from the electrical system.

BACKGROUND OF THE INVENTION

The fuel efficiency of a motor vehicle can be considerably enhanced with a hybrid system including an electric machine coupled to the engine, a high voltage battery pack, and a power electronics system for interconnecting the electric machine, the battery pack and the electrical loads of the vehicle. The electric machine is operable in a generating mode to charge the battery pack and supply power to various electrical loads, and in a motoring mode to crank the engine and to augment the engine power output. Various drive arrangements can be used to propel the vehicle. For example, the engine can be coupled to the drive wheels through a conventional drivetrain, and/or one or more electric propulsion motors can be used.

FIG. 1 illustrates an example of a hybrid vehicle system including an engine 10 that is mechanically coupled to a set of drive wheels 12 through a transmission (T) 14 and differential gearset (DG) 16. The hybrid vehicle system includes an AC electric machine 18, a main 120-volt battery pack 20, and a power conversion system 22. The electric machine 18 is selectively operable in generating and motoring modes, and is mechanically coupled to the engine 10, either directly or by way of a drive belt. The power conversion system 22 includes a high voltage DC bus 24, one or more bus capacitors 26 for maintaining the bus voltage, a power coupler 28 coupling the positive side of high voltage bus 24 to the battery pack 20, an inverter 30 coupling high voltage bus 24 to the electric machine 18, a DC-to-DC converter 32 coupling high voltage bus 24 to a low voltage DC bus 34, and a Power Control Unit (PCU) 36 for controlling the operation of inverter 30 and DC-to-DC converter 32. The power coupler 28 may be implemented with a fuse, with a controlled element such as a relay, or with a fuse in series with a relay; and in mechanizations where the power coupler 28 includes a relay, its on/off state is controlled by PCU 36 as indicated in FIG. 1. The low voltage DC bus 34 is used to supply power to various 12-volt electrical loads 38 of the vehicle, and an auxiliary 12-volt storage battery 40 is coupled to the low voltage bus 34 for maintaining the bus voltage and temporarily supplying power to the loads 38 in the event of a system failure.

In mechanizations where the power coupler 28 includes a relay or other controlled element, the PCU 36 is programmed to open the relay when a failure mode requiring battery pack disconnection is detected. In order to minimize the current that the relay must break and to prevent load-dump transient voltages, the PCU 36 ordinarily powers down the inverter 30 and DC-to-DC converter 32 prior to opening the relay. However, once the relay is open and the battery pack 20 is off-line, there is insufficient reserve electrical power in the bus capacitor 26 to re-activate the electric machine 18, and the only source of power for the electrical loads 38 is the auxiliary storage battery 40. A similar situation occurs in mechanizations where the power coupler 28 includes a fuse that opens in response to an over-current condition, except that the inverter current automatically collapses when the fuse opens. In either case, the battery pack disconnection significantly limits the post-failure range of the vehicle because certain electrical loads such as the engine ignition system are required for continued operation of engine 10, and the auxiliary battery 40 can only power such loads for a limited period of time. Accordingly, what is needed is a way of utilizing the generating capability of the electric machine 18 to power the vehicle following a controlled or uncontrolled disconnection of battery pack 20 from the high voltage bus 24.

SUMMARY OF THE INVENTION

The present invention is directed to an improved control methodology for an engine-driven electric machine of a hybrid vehicle electrical system for enabling continued operation of the vehicle electrical system under failure mode conditions that require or result in disconnection of the battery pack from the electrical system. At the onset of a failure mode condition requiring disconnection of the battery pack in systems including a controlled power coupler such as a relay, the electric machine is operated as a generator and is controlled in accordance with a first mode of operation that drives the battery pack current toward zero. When the battery pack current falls below a near-zero threshold, the power coupler is activated to disconnect the battery pack from the electrical system. Once the battery pack is disconnected from the electrical system, whether by relay or fuse, the electric machine is controlled according to a second mode of operation that maintains the bus voltage of the electrical system at a specified value. In both operating modes, the electric machine is controlled based on a synchronous vector current command that is determined directly as a function of the control objective (zero battery pack current or maintaining bus voltage) for improved response time compared to a traditional torque-based control.

DESCRIPTION OF THE PREFERRED EMBODIMENT

Figure 1:
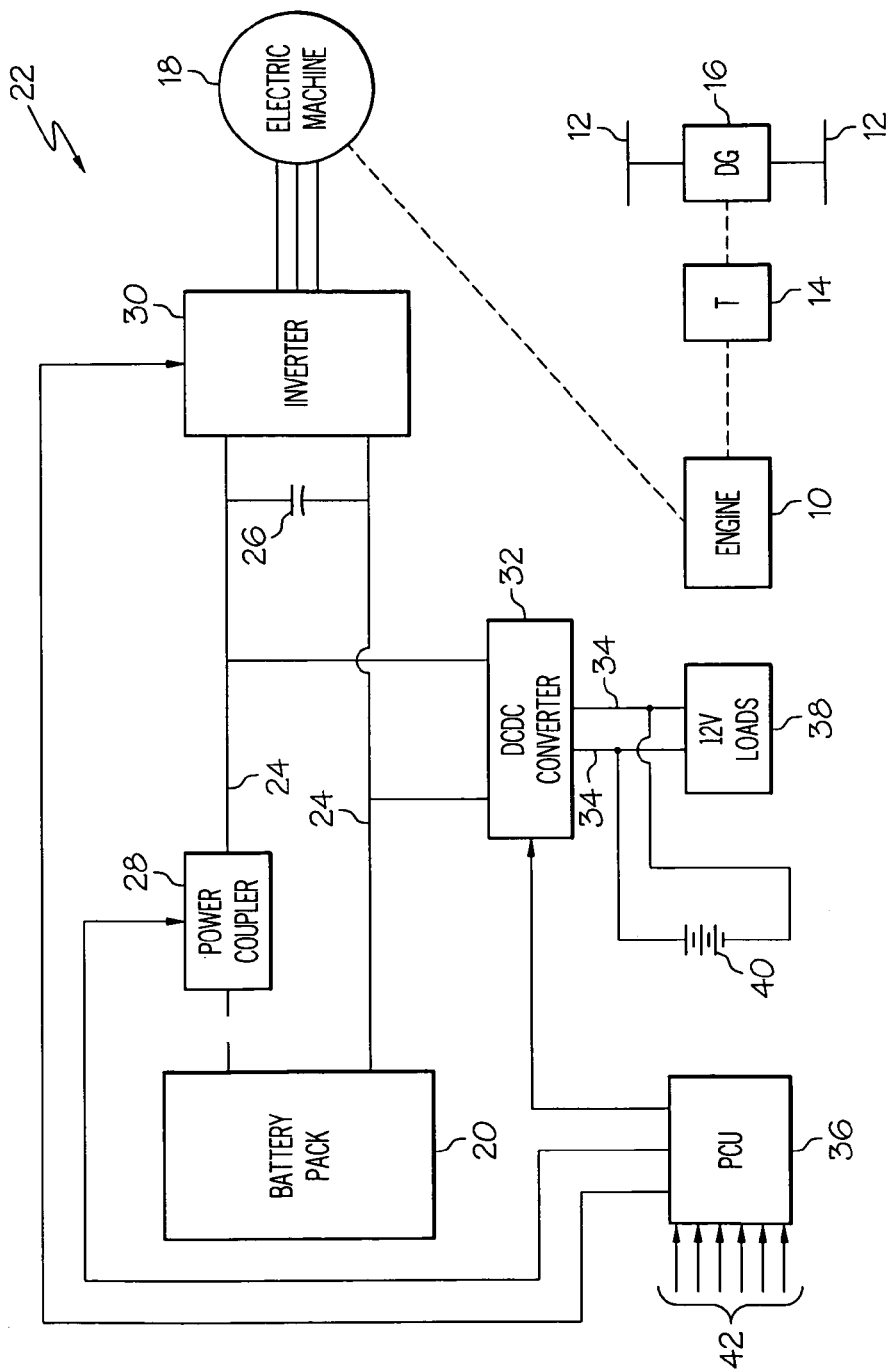
FIG. 1 is a block diagram of an exemplary hybrid vehicle electrical system and powertrain, including an engine, a high voltage battery pack, a power coupler, an inverter, an engine-driven electric machine operable in generating and motoring modes, and a microprocessor-based Power Control Unit.

While the method of the present invention is disclosed herein in the context of the exemplary hybrid vehicle electrical system and powertrain of FIG. 1, it should be understood that the described method is applicable to any hybrid vehicle electrical system including a battery pack and an engine-driven electric machine. Virtually all hybrid vehicle electrical systems include a battery pack for storing electrical energy and an engine-driven electric machine selectively operable in a generating mode to charge the battery pack and supply power to various electrical loads, and in a motoring mode to crank the engine and to augment the engine power output. And in all such configurations, there is the possibility of a failure mode condition that requires or will result in disconnection of the battery pack from the vehicle electrical system. If a contactor device such as a relay is used to disconnect the battery pack, the battery pack current is first reduced to ensure safe and reliable current interruption. But the conventional approach of powering down the inverter 30 and DC-to-DC converter 32 to reduce the battery pack current discharges the bus capacitor 26, leaving insufficient reserve electrical power to re-activate the electric machine 18. And of course, the same thing can happen when the battery pack disconnect occurs due to opening of an in-line fuse due to an over-current condition. In both cases, the auxiliary storage battery 40 is then the only source of power for the electrical loads 38, and the vehicle range will be substantially curtailed, particularly in hybrid configurations that utilize electric propulsion motors.

The method of the present invention overcomes the problem outlined above by utilizing the generating capability of the electric machine 18 to enable continued vehicle operation after the battery pack 20 is disconnected from the high voltage bus 24. In mechanizations where the power coupler 28 includes a relay, the battery pack current is first minimized by operating the electric machine 18 with the control objective of driving the battery pack current substantially to zero. And once the battery pack 20 is safely disconnected, whether by relay or fuse, the electric machine 18 is operated with the control objective of maintaining the high voltage bus 24 at a desired voltage to enable continued normal operation of the vehicle until the engine 10 is turned off.

An important aspect of the present invention is that under fault conditions that require or result in battery pack disconnection, the electric machine control for enabling continued operation of the vehicle is carried out by bypassing the usual torque-based control, and directly determining the synchronous vector current required to achieve the control objective. The control is described herein in the context of an AC induction machine, but is also applicable synchronous reluctance and permanent magnet AC electric machines. The regulated current to the machine can be broken into direct and quadrature vector components. In a basic system, the quadrature or q-axis component (Iqs) is used to quickly control the produced torque or generating power, and the direct or d-axis component (Ids) is used to control the flux level of the machine, which changes at a slower rate. The two current vectors interact to produce torque equal to $[(3/2)*(P/2)*(L_m^2/L_r)*Iqs*Ids]$, where P is the pole number of the machine, Lm is the magnetizing inductance, and Lr is the rotor inductance.

When the control objective is reducing the battery current to zero, while continuing to provide power to electrical loads 38 via DC-to-DC converter 32, the synchronous current vector command Iqs_CMD is determined as follows:

$$Iqs\_CMD = (0 - I\_BP) * [k_p + (k_i/s)] \quad (1)$$

where I_BP is the battery pack current and the term $[k_p+(k_i/s)]$ denotes a generic proportional-plus-integral control function. In other words, the current vector command Iqs_CMD is directly determined as a function of the deviation of I_BP from the target value of zero current. When the control objective is maintaining the HV bus voltage at a target value V_BUS_TAR, the synchronous current vector command Iqs_CMD is determined as follows:

$$Iqs\_CMD = -1*(V\_BUS\_TAR - HV\_BUS)*[k_p+(k_i/s)] \quad (2)$$

where HV_BUS is the voltage of high voltage bus 24. In this case, the current vector command Iqs_CMD is directly determined as a proportional-plus-integral function of deviation of HV_BUS from the target value V_BUS_TAR. In both control modes, the commanded value for the d-axis component of the stator current, or Ids_CMD, is preferably determined by table look-up as a function of the actual (measured) value of Iqs and/or machine speed, but it will be appreciated that other flux control strategies could alternatively be utilized.

Figure 2:
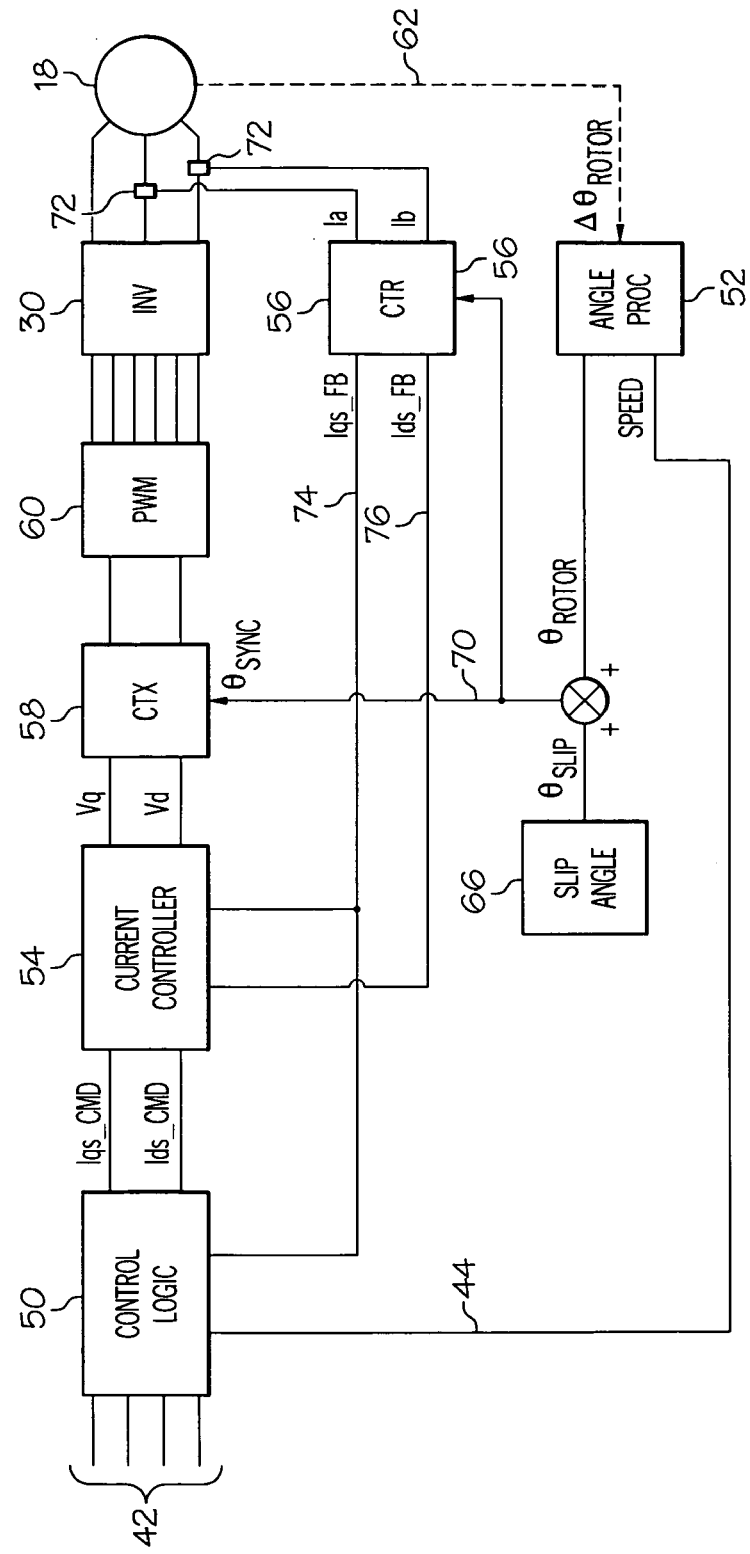
FIG. 2 is a block diagram of the Power Control Unit, the inverter and the electric machine of FIG. 1.

The block diagram of FIG. 2 illustrates the above-described control scheme in the context of an induction machine 18. Referring to FIG. 2, the inverter 30 and electric machine 18 correspond to the same components of FIG. 1, and the remaining items represent either sensors or the relevant functions performed by PCU 36 of FIG. 1. The Control Logic block 50 determines the q-axis and d-axis synchronous current commands Iqs_CMD and Ids_CMD in response to various inputs generally identified in FIG. 2. The reference numeral 42 designates a number of system-related inputs such as V_BP (battery pack voltage), I_BP and HV_BUS, the reference numeral 44 designates a machine speed input (Speed) produced by Angle Processing block 52, and the reference numeral 74 represents a q-axis current feedback signal Iqs_FB produced by Coordinate Transform and Rotation (CTR) block 56. The flow diagram of FIG. 3 describes how Control Logic block 50 determines Iqs_CMD and Ids_CMD for a system in which the power coupler 28 is a fuse, whereas the flow diagram FIG. 4 describes how Control Logic block 50 determines Iqs_CMD and Ids_CMD for a system in which the power coupler 28 is a relay, or a fuse in series with a relay.

The synchronous current commands Iqs_CMD and Ids_CMD developed by Control Logic block 50 are applied as inputs to the Current Controller 54, which also receives feedback current values Iqs_FB and Ids_FB from Coordinate Transform and Rotation block 56 via lines 74 and 76. Current Controller 54 develops a q-axis voltage command Vq based on the deviation of Iqs_FB from Iqs_CMD, and a d-axis voltage command Vd based on the deviation of Ids_FB from Ids_CMD. In both cases, the control function preferably includes both proportional and integral control terms. The voltage commands Vq_CMD and Vd_CMD, like the current commands Iqs_CMD and Ids_CMD, are based on frame of reference that is synchronous with the d-axis rotor flux of the electric machine 18, and the Coordinate Transform (CTX) block 58 transforms (rotates) the voltage commands Vq_CMD and Vd_CMD to a stationary reference frame, using a synchronous rotor phase angle input θsync provided by blocks 52, 66 and 68 (described below) on line 70. The transformed voltage commands are applied as control inputs to PWM Generator 60, which in turn, correspondingly activates the switching elements of inverter 30.

As mentioned above, the Angle Processing block 52 develops the speed input on line 44, and in conjunction with blocks 66 and 68, the synchronous rotor phase angle input θsync on line 70. Angle Processing block 52 is responsive to the output of an output shaft (i.e., rotor) rotation encoder, as represented by the broken line 62. Angle Processing block 52 determines the machine speed (i.e., the speed input on line 44) as the time rate of change in rotor position, and the rotor position θrotor in electrical degrees. Since the machine 18 is an induction machine in the illustrated embodiment, the synchronous phase angle input θsync is determined according to the sum of θrotor and a slip angle θslip provided by Slip Angle Calculator 66. In embodiments where the machine 18 is a synchronous reluctance machine or a permanent magnet AC machine, the determined value of θrotor is used for θsync.

As also mentioned above, the Coordinate Transform and Rotation block 56 provides feedback currents Iqs_FB and Ids_FB to Current Controller 54 on lines 74 and 76. The feedback currents Iqs_FB and Ids_FB are obtained by measuring the phase currents Ia and Ib of electric machine 18 using the current sensors 72, converting the phase currents to corresponding q-axis and d-axis current vectors, and then transforming the current vectors from a stationary frame of reference to a frame of reference that is synchronous with the d-axis rotor flux of the electric machine 18, using the synchronous phase angle input θsync developed by blocks 52, 66 and 68.

Figure 3:
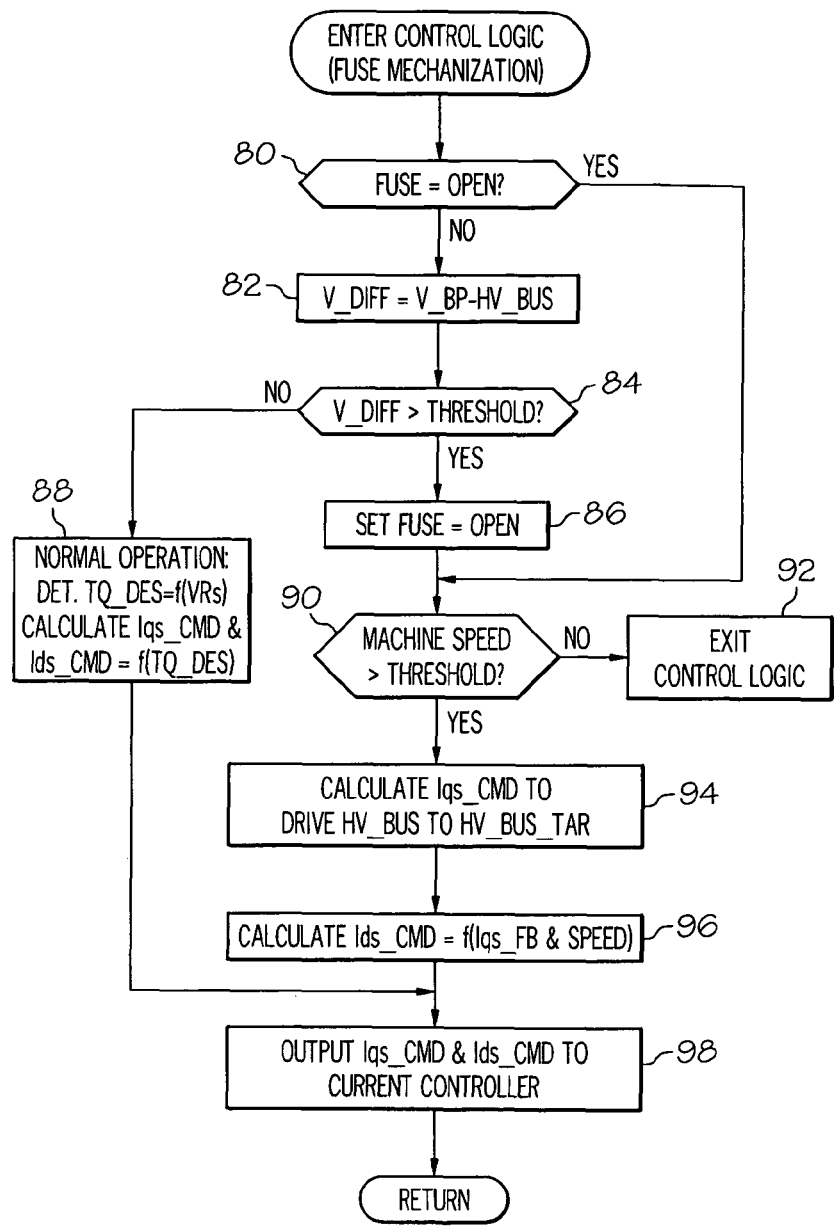
FIG. 3 is flow diagram representing a control methodology according to this invention that is implemented by the Power Control Unit of FIG. 1 for a system in which the power coupler includes only a fuse.

The flow diagram of FIG. 3 represents a software routine carried out by PCU 36 of FIG. 1 for implementing the functionality of Control Logic block 50 of FIG. 2 for a system in which the power coupler 28 is a fuse that automatically opens in response to an over-current fault. Since fuse opening is an uncontrolled event, the flow diagram blocks 80-86 pertain to fuse-opening detection. Prior to detection of a fuse-opening event, block 80 is answered in the negative and blocks 82-84 are executed to determine if a fuse-opening event has occurred. Block 82 computes a voltage difference V_DIFF between the battery pack voltage V_BP and the voltage HV_BUS across high voltage bus 24. If the voltage difference V_DIFF exceeds a specified threshold voltage such as 5 VDC, block 84 is answered in the affirmative, and block 86 sets a flag to indicate that a fuse-opening event has been detected. In that case, block 80 will thereafter be answered in the affirmative, and blocks 82-86 will be skipped as indicated. Also, it will be understood that fuse opening may be detected using other readily available parameters such as the value or rate of change in I_BP and/or HV_BUS.

Prior to the detection of a fuse-opening event by block 84, the electric machine 18 is operated normally, as indicated by blocks 88 and 98. This involves determining a desired torque TQ_DES for electric machine 18 based on vehicle requirements (VRs), calculating q-axis and d-axis current vector commands Iqs_CMD and Ids_CMD corresponding to TQ_DES, and outputting Iqs_CMD and Ids_CMD to the Current Controller 54 of FIG. 2. In the motoring mode, TQ_DES represents the desired torque output of machine 18; and in the generating mode, TQ_DES represents a load torque that is borne by engine 10 to generate electrical power for the power conversion system 22.

Controlling electric machine 18 as a function of desired torque as described in reference to blocks 88 and 98 provides sufficiently fast response for normal operation of the vehicle, but may not be sufficiently fast to prevent the bus capacitance 26 from discharging when the fuse of power coupler 28 opens due to an over-current condition. For this reason, the normal torque-based control of block 88 is by-passed when a fuse-opening event is detected by blocks 80-86. First however, block 90 compares the machine speed to a threshold speed such as 1000 RPM; if the machine speed is less than the threshold, there is insufficient generating capability to proceed, and the control logic is exited, as indicated by block 92. However, if the machine speed is greater than the threshold, blocks 94 and 96 are executed to calculate q-axis and d-axis current vectors Iqs_CMD and Ids_CMD for achieving the control objective of maintaining HV_BUS at the target value HV_BUS_TAR. The q-axis current vector Iqs_CMD is calculated based on the bus voltage error as described above in reference to equation (2), and the d-axis current vector Ids_CMD is determined by table look-up as a function of Iqs_FB and the machine speed. And block 98 then outputs the current vector commands to the Current Controller 54 of FIG. 2.

Figure 4:
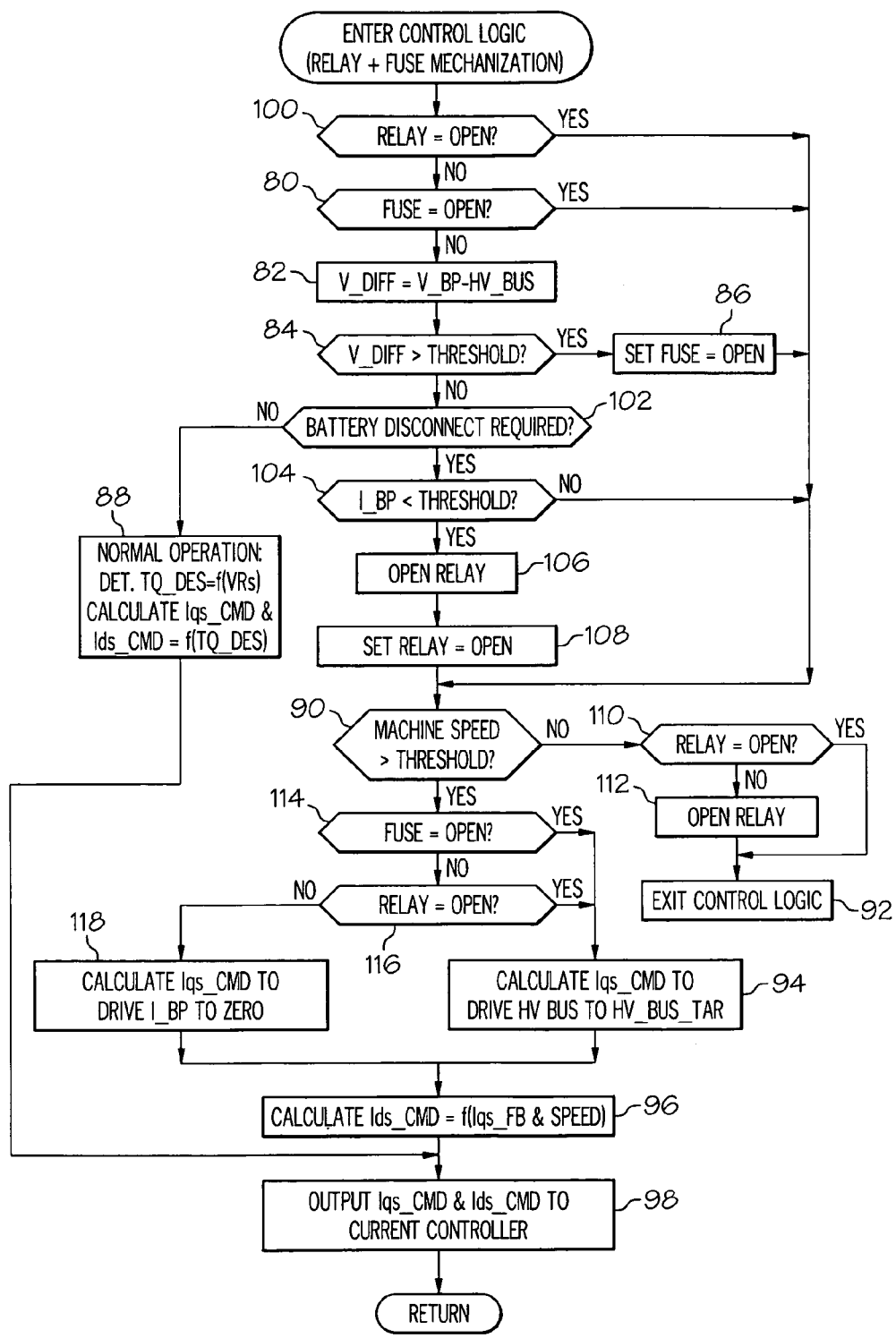
FIG. 4 is flow diagram representing a control methodology according to this invention that is implemented by the Power Control Unit of FIG. 1 for a system in which the power coupler includes both a fuse and a relay.

The flow diagram of FIG. 4 represents a software routine carried out by PCU 36 of FIG. 1 for implementing the functionality of Control Logic block 50 of FIG. 2 for a system in which the power coupler 28 is implemented with a relay in series with a fuse that automatically opens in response to an over-current fault. In mechanizations where the power coupler 28 includes a relay (or other controlled disconnect device) but not a fuse, the portions of the flow diagram pertaining only to fuse-opening detection (i.e., blocks 80-86 and 108) are omitted.

During conditions where relay-based disconnection of the battery pack 20 is not required, the flow diagram of FIG. 4 operates the same as the flow diagram of FIG. 3. That is, torque-based normal operation of the machine 18 occurs prior to detection of a fuse-opening event, and current vector-based override control of the machine 18 occurs to maintain the HV bus voltage upon detection of a fuse-opening event. Thus, the reference numerals designating blocks 80-98 of FIG. 3 are repeated in the flow diagram of FIG. 4.

Referring now specifically to FIG. 4, the block 100 is first executed to determine if the relay is already open. Initially of course, block 100 will be answered in the negative, resulting in the execution of fuse-opening detection blocks 80-86 as described above in reference to the flow diagram of FIG. 3. If the fuse is not open, block 84 will be answered in the negative, and block 102 is executed to determine if there is a fault condition requiring disconnection of battery pack 20. If the absence of such a fault condition, blocks 88 and 98 are executed as described above in reference to the flow diagram of FIG. 3 to carry out a normal torque-based control of electric machine 18 based on vehicle requirements (VRs). However, if battery pack disconnection is required, block 104 is first executed to determine if the battery pack current (I_BP) is below a threshold current such as 2 A. If so, blocks 106 and 108 are executed to open the relay and set a flag to show the relay status; in subsequently executions of the routine, block 100 will be answered in the affirmative to skip the blocks 80-88 and 102-108. However, if I_BP is not below the current threshold, the remainder of the routine (i.e., beginning at block 90) is first executed to control electric machine 18 to drive the I_BP substantially to zero.

The portion of the routine beginning at block 90 is executed whenever a battery pack disconnect has occurred, or a relay-based battery pack disconnect is required. The block 90 is first executed to ensure that the machine speed is sufficiently high, as described above in respect to the flow diagram of FIG. 3. If not, the system reverts to a conventional control strategy in which the relay is opened after shutting down inverter 30 and DC-to-DC converter 32. Block 110 checks whether the relay is already open, and if it is not, block 112 is executed to open the relay using the conventional control strategy. In either event, the control logic routine is then exited at block 92. However, if the machine speed exceeds the threshold of block 90, block 114 is executed to determine if fuse opening has been detected. If so, blocks 94-98 are executed to operate electric machine 18 to maintain the bus voltage HV_BUS at the target value HV_BUS_TAR, as described above in respect to the flow diagram of FIG. 3. If fuse opening has not been detected, block 116 is executed to determine if the relay is open. If the relay is not open, blocks 118, 96 and 98 are executed to operate electric machine 18 in a manner to drive the bus current I_BP substantially to zero. Specifically, block 118 calculates a q-axis current vector Iqs_CMD based on the battery pack current error as described above in reference to equation (1), and block 96 determines a d-axis current vector Ids_CMD by table look-up as a function of Iqs_FB and machine speed. And block 98 then outputs the current vector commands to the Current Controller 54 of FIG. 2. Once I_BP is reduced below the threshold and block 106 is executed to open the relay, block 116 will be answered in the affirmative, triggering the execution of blocks 94-98 to operate electric machine 18 for maintaining the bus voltage HV_BUS at the target value HV_BUS_TAR, as described above in respect to the flow diagram of FIG. 3.

In summary, the present invention provides a fast response control methodology for safely and reliably disconnecting the battery pack 20 from the high voltage bus 24 without having to forego the generating capability of the electric machine 18, thereby avoiding a walk-home condition, and maintaining normal operation of the engine 10 and other vehicle electrical loads 38 until the engine 10 is turned off. While the control methodology has been described in reference to the illustrated embodiment, it should be understood that various modifications in addition to those mentioned above will occur to persons skilled in the art. Accordingly, it is intended that the invention not be limited to the disclosed embodiment, but that it have the full scope permitted by the language of the following claims.

The invention claimed is:

1. A control methodology for a hybrid vehicle electrical system including one or more electrical loads, an engine-driven AC electric machine operable as a generator for supplying power to said electrical loads via a high voltage bus, and a high voltage battery pack coupled to the high voltage bus by a relay that can be opened to disconnect the battery pack from the high voltage bus under fault conditions, the control methodology comprising the steps of:

detecting a fault condition requiring disconnection of the battery pack from the high voltage bus; and in response to detection of the fault condition:

determining if a current of said battery pack is above a threshold;

if the current of said battery pack is above the threshold current, controlling said electric machine based on vector current commands calculated to output a voltage effective to drive the current of said battery pack toward zero current;

activating said relay to disconnect said battery pack from the high voltage bus when the current of said battery pack falls below said threshold current; and after disconnection of said battery pack from said high voltage bus, controlling said electric machine based on vector current commands calculated to maintain an operating voltage of said high voltage bus at a target voltage to enable continued operation of said electrical loads.

2. The control methodology of claim 1, where the hybrid vehicle electrical system includes a fuse that opens to disconnect the battery pack from the high voltage bus due to an over-current condition, the control methodology including the steps of:

detecting opening of said fuse; and in response to the detection of fuse opening, initiating the step of controlling said electric machine based on vector current commands calculated to maintain an operating voltage of said high voltage bus at a target voltage to enable continued operation of said electrical loads.

3. The control methodology of claim 2, including the step of:

detecting opening of said fuse based on a comparison of the operating voltage of said high voltage bus and a voltage of said battery pack.

4. The control methodology of claim 1, where the step of controlling said electric machine based on vector current commands calculated to maintain an operating voltage of said high voltage bus at a target voltage includes the steps of:

calculating a q-axis vector current command for said electric machine based on the deviation of the operating voltage of said high voltage bus from the target voltage; and calculating a d-axis vector current command for said electric machine based on a measure of q-axis current in said electric machine.

5. The control methodology of claim 1, where the step of controlling said electric machine based on vector current commands calculated to drive the current of said battery pack toward zero current includes the steps of:

calculating a q-axis vector current command for said electric machine based on the deviation of the current of said battery pack from zero current; and calculating a d-axis vector current command for said electric machine based on a measure of q-axis current in said electric machine.

\* \* \* \* \*